(12) United States Patent
Delong

(10) Patent No.: US 10,116,650 B2
(45) Date of Patent: *Oct. 30, 2018

(54) METHODS AND SYSTEMS FOR CONTACT IMPORTING USING A MOBILE DEVICE

(71) Applicant: Facebook, Inc., Menlo Park, CA (US)

(72) Inventor: Kyle William Delong, Tokyo (JP)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,682

(22) Filed: Jun. 28, 2016

(65) Prior Publication Data
US 2017/0149761 A1    May 25, 2017

Related U.S. Application Data

(63) Continuation of application No. 13/662,189, filed on Oct. 26, 2012, now Pat. No. 9,406,081.

(51) Int. Cl.
| | |
|---|---|
| *H04L 29/06* | (2006.01) |
| *H04W 4/21* | (2018.01) |
| *H04W 4/60* | (2018.01) |
| *G06Q 10/10* | (2012.01) |
| *G06Q 30/02* | (2012.01) |
| *G06Q 30/06* | (2012.01) |
| *G06F 17/30* | (2006.01) |
| *H04L 29/12* | (2006.01) |
| *H04L 29/08* | (2006.01) |

(Continued)

(52) U.S. Cl.
CPC ...... *H04L 63/083* (2013.01); *G06F 17/30575* (2013.01); *G06Q 10/10* (2013.01); *G06Q 30/0241* (2013.01); *G06Q 30/0601* (2013.01); *H04L 61/1594* (2013.01); *H04L 67/02* (2013.01); *H04W 4/21* (2018.02); *H04W 4/60* (2018.02); *H04W 12/06* (2013.01); *G06Q 50/01* (2013.01)

(58) Field of Classification Search
CPC .............. G06Q 50/01; G06Q 30/0613; G06Q 30/0601; G06Q 10/10; G06Q 30/0241; H04L 51/32; H04L 63/10; H04L 67/22; H04L 61/1594; H04W 4/003; H04W 4/206

See application file for complete search history.

(56) References Cited

U.S. PATENT DOCUMENTS

| | | | | |
|---|---|---|---|---|
| 5,577,188 | A | * 11/1996 | Zhu ..................... | G06F 3/0481 715/202 |
| 5,608,872 | A | * 3/1997 | Schwartz ............ | H04L 12/1813 345/502 |
| 9,406,081 | B2 | * 8/2016 | DeLong ................ | H04W 4/003 |

(Continued)

*Primary Examiner* — Sargon Nano
(74) *Attorney, Agent, or Firm* — Baker Botts L.L.P.

(57) ABSTRACT

Techniques to allow a social networking system to import contact information from an external system. In one embodiment, a QR code is provided to a non-mobile computing device to allow a log in to an external system by a user using a mobile computing device. Information from the external system is received after authentication of the user with the external system. The information includes address book information of the user. The address book information includes contact information maintained by the external system. Invitations are provided to a selection of the new contacts to join the social network of the user.

13 Claims, 9 Drawing Sheets

(51) Int. Cl.
 *H04W 12/06* (2009.01)
 *G06Q 50/00* (2012.01)

(56) References Cited

U.S. PATENT DOCUMENTS

| 9,953,273 B2* | 4/2018 | Ziemann | G06F 17/30 |
| 2013/0007029 A1* | 1/2013 | Ziemann | G06F 17/30 |
| | | | 707/758 |

* cited by examiner

METHODS AND SYSTEMS FOR CONTACT IMPORTING USING A MOBILE DEVICE

FIELD OF THE INVENTION

The present application relates to a social networking system and, in particular, contact information management.

BACKGROUND

Social networking websites provide a dynamic environment in which members can connect to and communicate with other members. These websites may commonly provide online mechanisms allowing members to interact within their preexisting social networks, as well as create new social networks. Members may include any individual or entity, such as an organization or business. Among other attributes, social networking websites allow members to effectively and efficiently communicate relevant information to their social networks.

A member of a social network may highlight or share personal information, news stories, relationship activities, music, and any other content of interest to areas of the website dedicated to the member. Other members of the social network may access the shared content by browsing member profiles or performing dedicated searches. Upon access to and consideration of the content, the other members may react by taking one or more responsive actions, such as providing an opinion about the content, or other feedback. The ability of members to interact in this manner fosters communications among them and helps to realize the goals of social networking websites.

The experience of a user of a social networking website may be enhanced by the addition of relatives, friends, colleagues, and other contacts to her social network. Contact information for the contacts of the user may be distributed over many disparate systems and applications. When distributed in this manner, the management of contact information may impede the ability of the user to communicate with the contacts and to present invitations for the contacts to join the social network of the user. As a result, optimal growth of the social network of the user may be compromised.

SUMMARY

To allow a social networking system to import contact information from an external system, embodiments of the invention include systems, methods, and computer readable media to provide a reference to a non-mobile computing device to allow a log in to an external system by a user using a mobile computing device. Information from the external system is received after authentication of the user with the external system.

In an embodiment, the computer system is a social networking system.

In an embodiment, the reference includes a QR code associated with the user.

In an embodiment, an indication is provided for the user to provide credentials for the log in. The log in by the user includes provision of a PIN by the user. The authentication is based on an identifier associated with the mobile computing device.

In an embodiment, a notice is provided for the user to perform the log in with the mobile computing device. A progress bar is provided to guide the user through a sequence associated with contact importing.

In an embodiment, the information includes address book information of the user. The address book information includes contact information maintained by the external system. Contact information maintained by the computer system is retrieved. The contact information maintained by the external system and the contact information maintained by the computer system are synchronized. New contact information including new contacts is identified based on the synchronizing. The new contact information is maintained in the computer system.

In an embodiment, a selection of the new contacts to be added to a social network of the user is requested. Invitations to join the social network of the user are provided to the selection of the new contacts.

In an embodiment, the external system includes a wireless service provider.

In an embodiment, the log in by the user to the external system using a mobile computing device requires fewer credentials than a log in by the user to the external system using the non-mobile computing device.

Many other features and embodiments of the invention will be apparent from the accompanying drawings and from the following detailed description.

Figure 1:
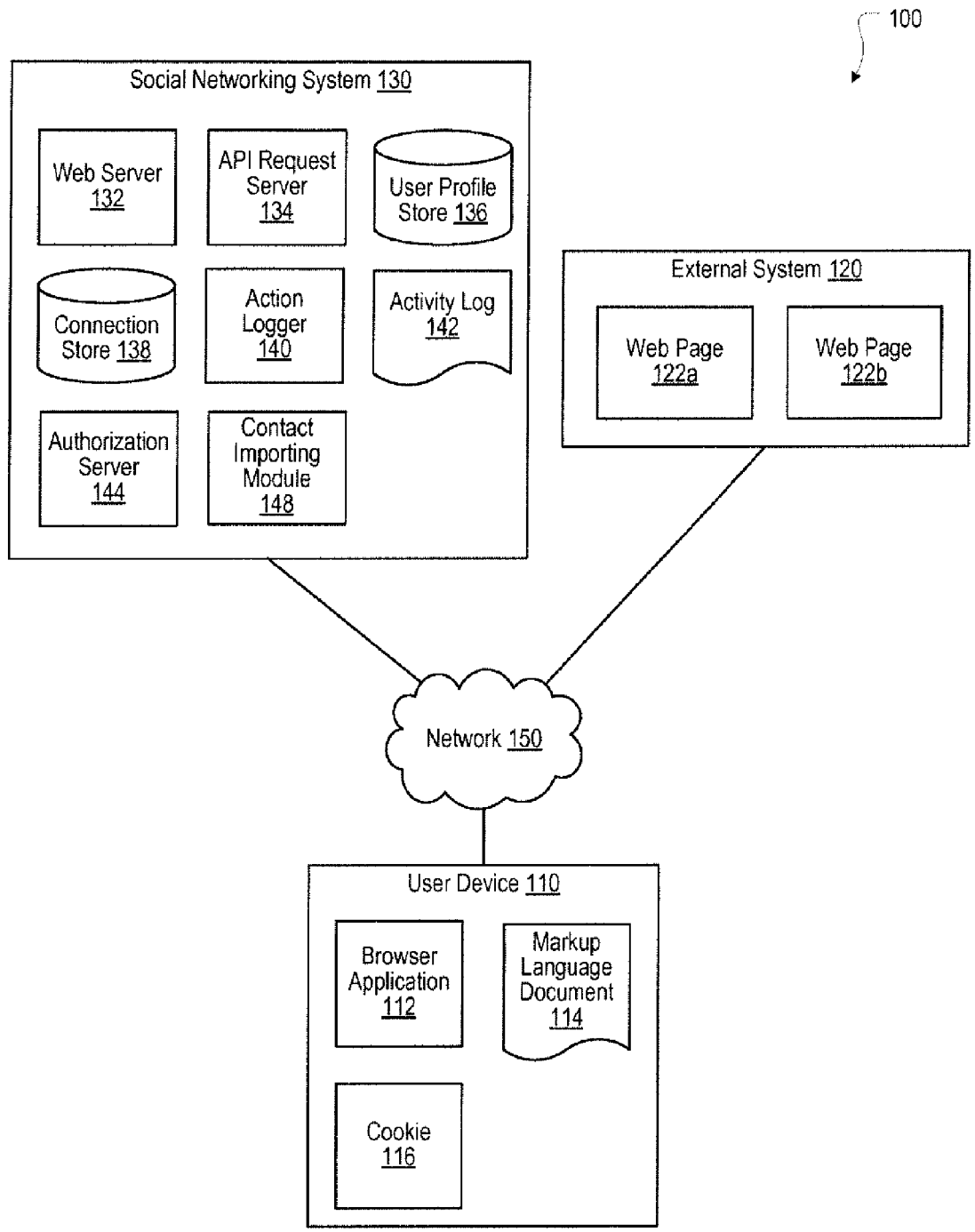
FIG. 1 is a network diagram of a system for contact importing with a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for contact importing in a social networking system 130 in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and a contact importing module 148. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user profile store 136 maintains information about user accounts, including biographic, demographic, and other types of descriptive information, such as work experience, educational history, hobbies or preferences, location, and the like that has been declared by users or inferred by the social networking system 130. This information is stored in the user profile store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user profile store 136 and the connection store 138 store instances of the corresponding type of objects maintained by the social networking system 130. Each object type has information fields that are suitable for storing information appropriate to the type of object. For example, the user profile store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user profile store 136 and the connection store 138 may be implemented as a federated database.

Data stored in the connection store 138, the user profile store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user profile store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The contact importing module 148 contains logic to allow a user of the social networking system 130 to import contacts from an address book separate from the social networking system 130. The address book may be a record of contacts of the user that are maintained by a wireless service provider with which the user may have a mobile phone account. The contact importing module 148 may cause a reference, such as a QR code, to be provided for a user that allows the user to log in to her account with the wireless service provider using the mobile phone. Upon authentication of the user and receipt of permission of the user, contact information maintained by the wireless service provider may be provided to the social networking system 130. The contact importing module 148 may synchronize the contact information with contact information already maintained by the social networking system 130 to identify new contacts. The contact importing module 148 may provide requests to selected new contacts to be added to the social network of the user, as described in more detail below.

Contact Importing

The social networking system 130 may maintain some contact information of a user. However, the entire contact information of the user may be maintained over a variety of systems including but not limited to the social networking system 130. The systems may involve various software applications that provide contact information storage and management capabilities, such as email applications, calendar applications, personal productivity applications, and dedicated contact management software. For example, the user may store and manage some contact information in a software application installed on a desktop computer. As another example, some contact information may be stored and managed by servers that provide the user access to a software application in the form of services. As yet another example, the user may store and manage some contact information with a software application installed on a mobile computing device. The ability to import and synchronize contact information distributed over various systems may pose many advantages for the user. Among them, the user may identify new contacts from the contact information who may be candidates for addition to the social network of the user with the social networking system 130.

Figure 2:
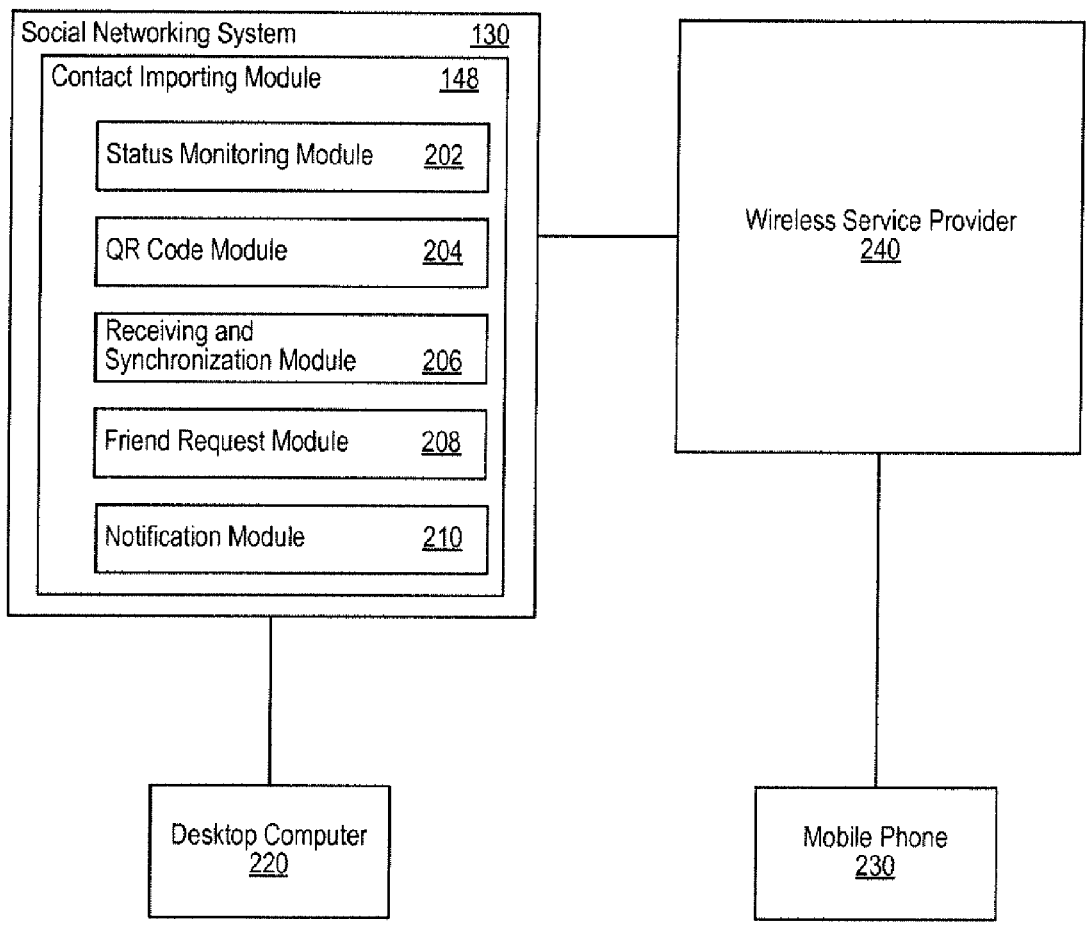
FIG. 2 illustrates a simplified block diagram of a system of interaction between an external system and a contact importing module of the social networking system in accordance with an embodiment of the invention.

FIG. 2 illustrates an example system to import contact information from a wireless service provider 240 to the social networking system 130 in accordance with an embodiment of the invention. The user may use a desktop computer (or other non-mobile computing device) 220 to communicate with the social networking system 130 to import contacts from an external system, such as a wireless service provider 240, to the social networking system 130. The wireless service provider 240 may provide voice and data services to a mobile phone 230 of the user. The mobile phone 230 may have installed a scanner that can read QR codes. In an embodiment, while QR codes are discussed herein, any suitable code (e.g., matrix barcode, n-dimensional barcode, two-dimensional code, UPC barcode, etc.) or other type of reference may be used in addition or as an alternative to QR codes. The wireless service provider 240 also may maintain some contact information about contacts with whom the user has communicated using the mobile phone 230. In an embodiment, the wireless service provider may be one external system 120, the desktop computer 220 may be one user device 110, and the mobile phone 230 may be another user device 110. The wireless service provider 240 may communicate, through APIs or other communication interfaces, with the social networking system 130 and exchange contact information with the social networking system 130.

The user may choose to log in to the wireless service provider 240 and initiate the transfer of contact information from the wireless service provider 240 to the social networking system 130 using the mobile phone 230. The user may scan with the mobile phone 230 a QR code presented by the social networking system 130 on the desktop computer 220 to access a log in page. Credentials for log in with the mobile phone 230 may be more easily remembered or entered as compared to credentials for log in with the desktop computer 220. In this regard, credentials for log in with the desktop computer 220 may require the provision by the user of, for example, both a user ID and a password. In contrast, credentials for log in with the mobile phone 230 may require the provision by the user of only a PIN. With respect to log in involving the mobile phone 230, the user be required to provide only a PIN because the identification of the mobile phone 230 may be automatically provided to the wireless service provider 240 as a requirement of a communications protocol governing communications between the mobile phone 230 and the wireless service provider 240. Thus, because a user may log in to the wireless service provider 240 by providing the PIN alone, the user, as a matter of convenience or efficiency, may opt to initiate contact importing from the wireless service provider 240 to the social networking system 130 with the mobile phone 230. The user may choose to log in to the wireless service provider 240 using the mobile phone 230 for other reasons related to, for example, convenience, habit, etc.

The contact importing module 148 of the social networking system 130 may include a status monitoring module 202, a QR code module 204, a receiving and synchronization module 206, a friend request module 208, and a notification module 210. The modules of the contact importing module 148 are exemplary, and may be variously combined into fewer modules or separated into additional modules. In an embodiment, the described functionality of the modules may be performed by other modules of the social networking system 130 apart from the contact importing module 148.

The notification module 210 interacts with the status monitoring module 202, the QR code module 204, the receiving and synchronization module 206, and the friend request module 208. The notification module 210 manages and provides notifications for the user to inform the user about information relevant to the importation of contact information from the wireless service provider 240. For example, the notification module 210 may create notices for the user about the status of the contact importation process and information regarding each step in the process.

The status monitoring module 202 may track the status of contact importing. Each step in the contact importation process may be tracked and presented for the user to keep the user apprised of progress. The steps may include, for example, providing a web page to the desktop computer 220 to allow the user to initiate importing of contact information from the wireless service provider 240, providing a QR code to the user, scanning the QR code with the mobile phone 230 to access the wireless service provider 240, using the mobile phone 230 to log in with the wireless service provider 240, importing and synchronizing contact information from the wireless service provider 240 to the social networking system 130, and requesting new contacts to become connected with the user in her social network. Based on tracking of the status of the contact importing, the status monitoring module 202 may prompt the user to provide appropriate information and take appropriate action in the contact importing process.

The QR code module 204 may generate a QR code for scanning with the mobile phone 230 of the user. In an embodiment, the QR code may be unique to the user. The QR code may correspond to a URL that may have an embedded reference identifying the user to the wireless service provider 240. When scanned by the mobile phone 230 of the user, the QR code may take the user to a page of the wireless service provider 240 that allows the user to log in to the wireless service provider 240 by providing appropriate credentials, such as a PIN.

The receiving and synchronization module 206 receives contact information maintained by the wireless service provider 240 and synchronizes the contact information already maintained by the social networking system 130. The contact information maintained by the wireless service provider 240 may be provided to the social networking system 130 after successful log in by the user to her account with the wireless service provider 240. The contact information received by the social networking system 130 may be compared with the contact information already maintained by it to identify new contact information. The new contact information may include the identity of new persons or entities associated with the user. The contact information maintained by the social networking system 130 may be updated with the new contact information.

The friend request module 208 may prepare requests to new contacts of the user to invite them to join the social network of the user. The new contacts may be determined from the new contact information. The friend request module 208 may identify all of the new contacts of the user, both persons and other entities, and invite the user to select among them. The new contacts selected by the user may be provided with an invitation to join the social network of the user.

Figure 3:
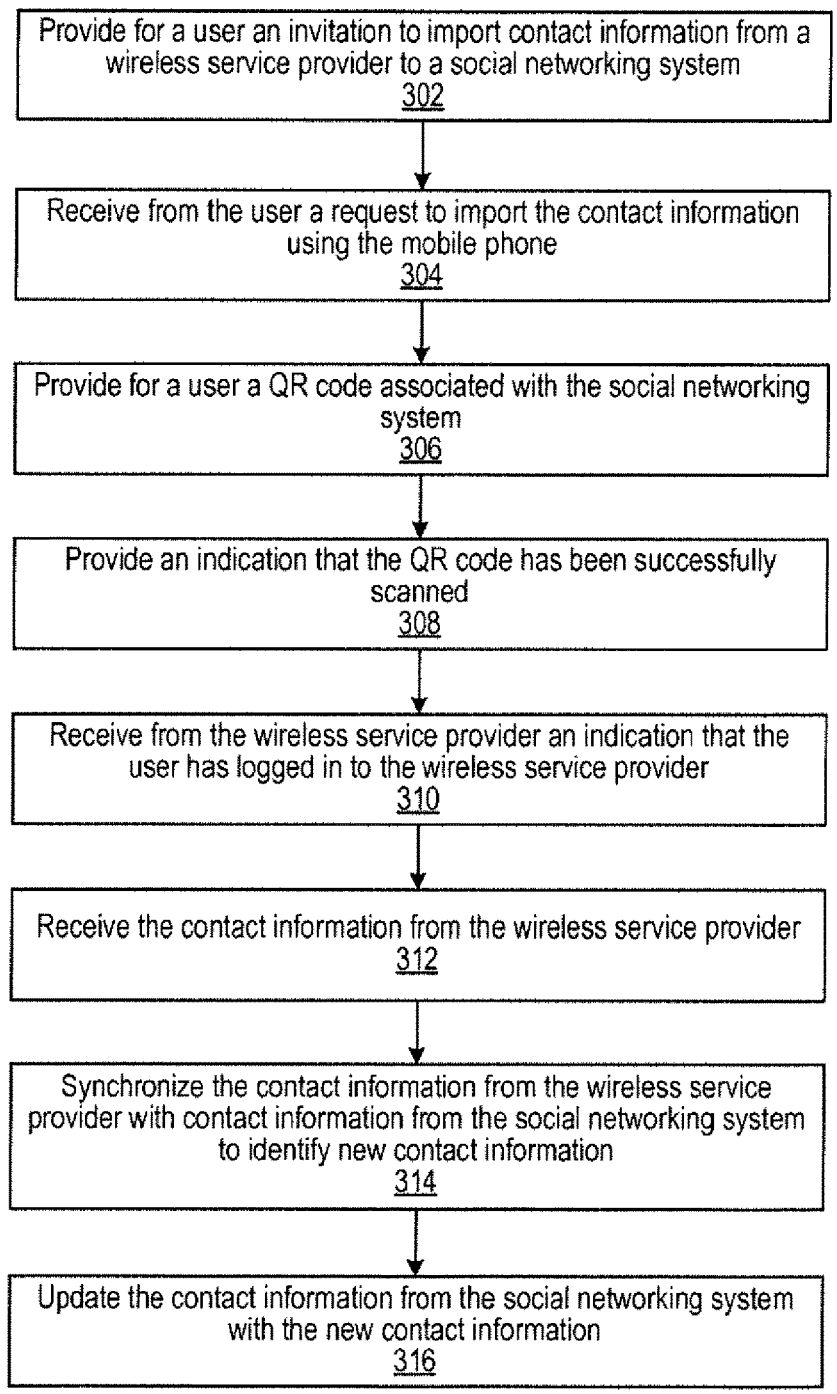
FIG. 3 is an example process for importing contact information from a wireless service provider to the social networking system in accordance with an embodiment of the invention.

FIG. 3 is an example process for importing contact information from the wireless service provider 240 to the social networking system 130 in accordance with an embodiment of the invention. At block 302, an invitation is provided for a user to import contact information from the wireless service provider 240 to the social networking system 130. The social networking system 130 may provide a web page to the desktop computer 220 allowing the user to initiate importing of contact information from the wireless service provider 240. To import contact information from the wireless service provider 240, the social networking system 130 first may request that the user log in to the wireless service provider 240. To log in to the wireless service provider 240, the social networking system 130 may provide an option for the user to log in using the desktop computer 220 or the mobile phone 230.

At block 304, a request from the user is received to import the contact information using the mobile phone 230.

At block 306, a QR code associated with the social networking system 130 is provided for the user. The QR code may be associated with a URL of the social networking system 130 that directs the user to a log in page of the wireless service provider 240. After the user scans the QR code with the mobile phone 230, the user may be automatically logged in to the social networking system 130 on the mobile phone 230, whether or not the mobile phone 230 was logged in before the scan. A token may be embedded in the QR code to allow the log in without provision of a password. The social networking system 130 may also provide a notification to the user about the automatic log in. After log in to the social networking system 130, the user is automatically redirected to a log in page of the wireless service provider 240. In an embodiment, after the QR code is scanned, the user may not be presented with a page of the social networking system 130 before presentation of the log in page of the wireless service provider 240. The QR code may be uniquely associated with the user.

At block 308, an indication that the QR code has been successfully scanned is provided for the user. Upon scanning of the QR code, the social networking system 130 may provide for the desktop computer 220 an indication that the QR code has been scanned. The social networking system 130 then may provide a request for the user to log in with the wireless service provider 240. In an embodiment, the social networking system 130 may choose whether to notify the wireless service provider 240 that the user has accessed the log in page of the wireless service provider 240 by scanning the QR code.

After the user scans the QR code, the wireless service provider 240 may provide to the mobile phone 230 a request for the user to log in to the wireless service provider 240. In response to the request, the user may enter her PIN number or other credential. After the PIN number of the user is entered and provided to the wireless service provider 240, the wireless service provider 240 may authenticate the user.

At block 310, an indication that the user has logged in to the wireless service provider 240 is received from the wireless service provider 240.

At block 312, the contact information from the wireless service provider 240 is received. The provision of contact information maintained by the wireless service provider 240 to the social networking system 130 may be automatic upon log in by the user without the need for the user to take any additional action.

At block 314, the contact information from the wireless service provider 240 is synchronized with contact information from the social networking system 130 to identify new contact information. Synchronization may include comparing and identifying differences between the contact information maintained by the wireless service provider 240 and the contact information already maintained by the social networking system 130. If the differences indicate that the contact information maintained by the social networking system 130 in part or in whole is incomplete or out of date, then the new contact information relating to the differences may be used to update the contact information maintained by the social networking system 130.

At block 316, the contact information from the social networking system 130 is updated with the new contact information. Upon updating, contact information maintained by the social networking system 130 is up to date and complete as to the contact information maintained by the wireless service provider 240.

Figure 4:
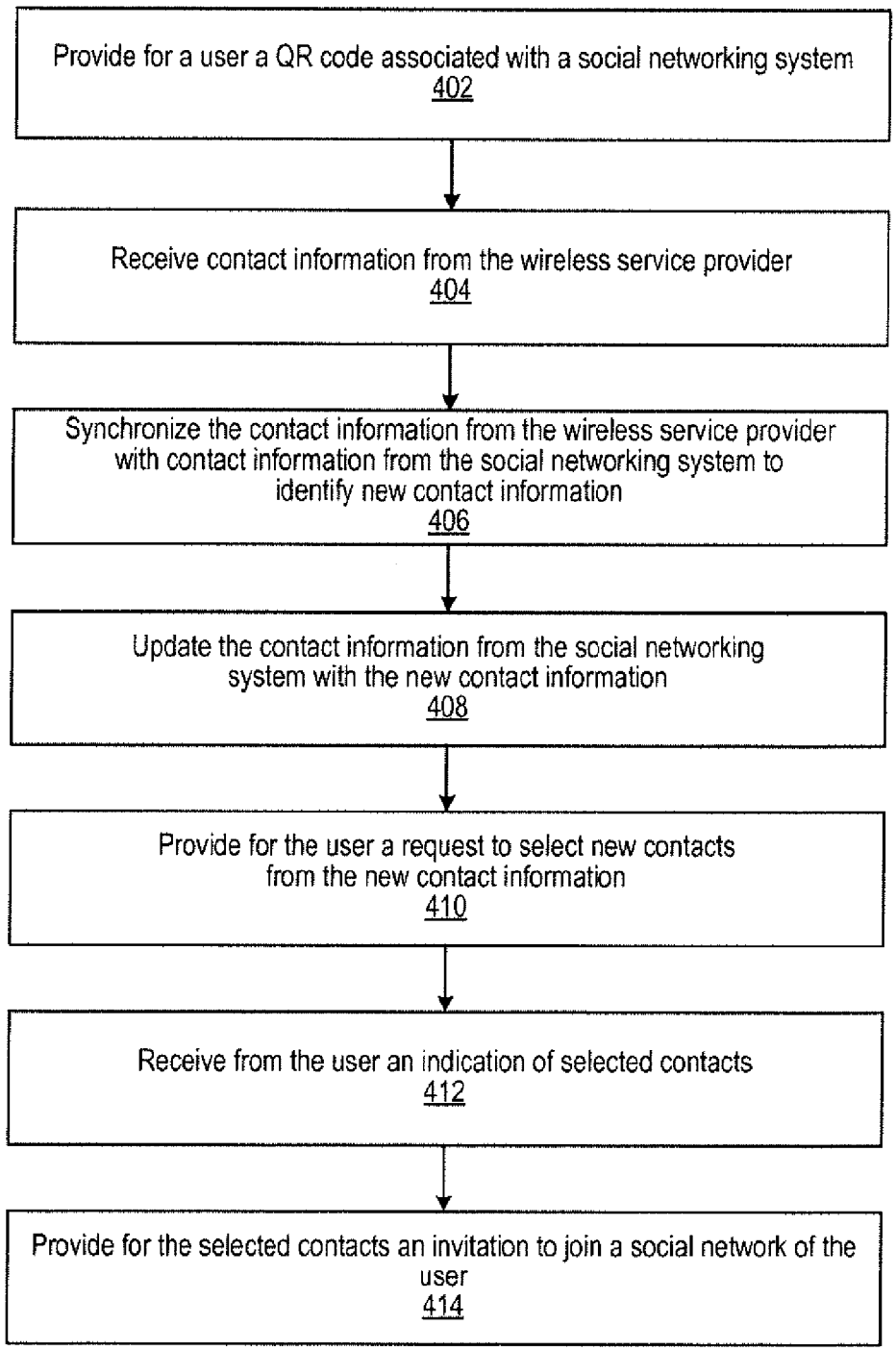
FIG. 4 is an example process for providing invitations to new contacts to join the social network of a user in accordance with an embodiment of the invention.

FIG. 4 is an example process for providing invitations to new contacts to join the social network of the user in accordance with an embodiment of the invention. At block 402, a QR code associated with a social networking system 130 is provided for a user. The QR code may be associated with a URL of the social networking system 130 that directs the user to a log in page of the wireless service provider 240. The QR code may be uniquely associated with the user. The QR code may be scanned by user with the mobile phone 230.

At block 404, the contact information from the wireless service provider is received. The provision of contact information maintained by the wireless service provider 240 to the social networking system 130 may be automatic upon log in by the user without the need for the user to take any additional action.

At block 406, the contact information from the wireless service provider 240 is synchronized with contact information from the social networking system 130 to identify new contact information. Synchronization may include comparing and identifying differences between the contact information maintained by the wireless service provider 240 and the contact information already maintained by the social networking system 130. If the differences indicate that the contact information maintained by the social networking system 130 in part or in whole is incomplete or out of date, then the new contact information relating to the differences may be used to update the contact information maintained by the social networking system 130.

At block 408, the contact information from the social networking system 130 is updated with the new contact information. Upon updating, contact information maintained by the social networking system 130 is up to date and complete as to the contact information maintained by the wireless service provider 240.

At block 410, a request to select new contacts from the new contact information is provided for the user. The request may be provided for the user in a web page that lists the new contacts and allows the user to select contacts therefrom.

At block 412, an indication of selected contacts is received from the user. The indication of selected contacts may be all, some, or none of the new contacts. The indication is a reflection of the desire of the user to invite certain contacts to join her social network.

At block 414, an invitation to join the social network of the user is provided for the selected contacts. The invitation may be an email, notice, or other type of communication. The invitation may be provided within or outside the social networking system 130. Upon acceptance of the invitation, each of the selected contacts may be joined in the social network of the user with the social networking system 130.

In an embodiment, the process 300 and the process 400 may be in whole or in part performed by the social networking system 130 or the contact importing module 148.

Figure 5A:
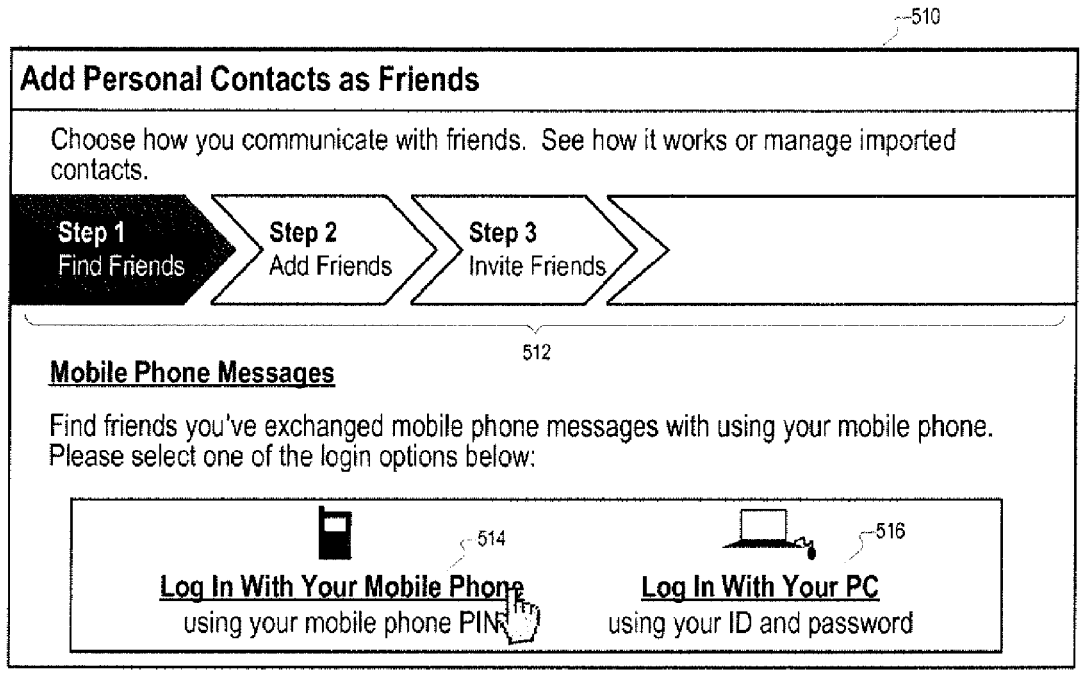
FIGS. 5A-5G illustrate example notices and functionality that may be provided for a user to import contacts from an external system in accordance with embodiments of the invention.

FIGS. 5A-5G illustrate example notices that may be provided for a user to import contact information from the wireless service provider 240 to the social networking system 130 in accordance with embodiments of the invention. FIG. 5A illustrates an example notice 510 for a user on her desktop computer to invite the user to import contact information from the wireless service provider 240 to the social networking system 130. The notice 510 may be provided as a web page by the social networking system 130. The notice 510 includes a progress bar 512 that includes different steps in a sequence to import contact information from the wireless service provider 240 to the social networking system 130. As shown, the steps include three exemplary steps through which the social networking system 130 may guide the user. A first step involves finding new contacts from the contact information maintained by the wireless service provider 240. The new contacts may not be included within the contact information originally maintained by the social networking system 130. A second step involves selecting which of the new contacts are to be added to the social network of the user on the social networking system 130. A third step involves preparing invitations to invite a selection of the new contacts to join the social network of the user. The notice 510 provides two methods for the user to log in to the wireless service provider 240 to initiate contact importing. The notice 510 includes an invitation or reference, associated with a link 514, for the user to log in to the wireless service provider 240 using a mobile phone of the user. The notice 510 also includes an invitation or reference, associated with a link 516, for the user to log in to the wireless service provider 240 using a desktop computer of the user.

Figure 5B:
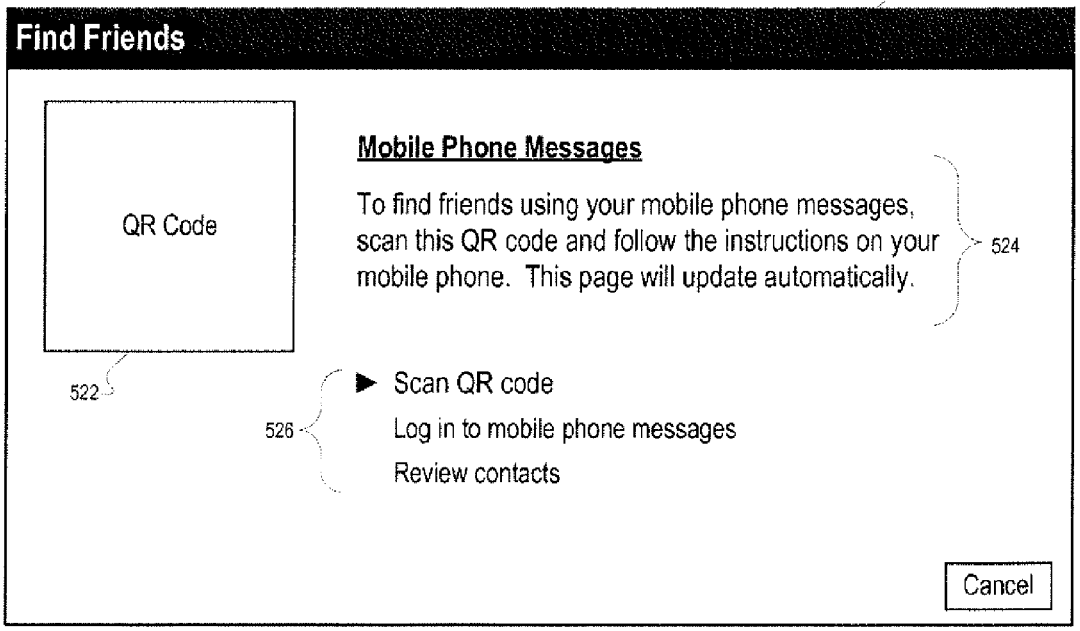

FIG. 5B illustrates an example notice 520 provided for the user on her desktop computer after the user selects the link 514 to log in to the wireless service provider 240 using her mobile phone. The notice 520 may be provided as a web page by the social networking system 130. The notice 520 includes a QR code 522 that is associated with the user and generated by the social networking system 130. When scanned by the mobile phone of the user, the QR code 522 may direct the user to a page of the wireless service provider 240 that allows the user to log in to the wireless service provider 240. The notice 520 includes a section 524 that provides instructions for the user to scan the QR code 522 and a reference to inform the user that the notice 520 may automatically update to reflect the current status of the contact importing process. The notice 520 includes a section 526 that guides the user in the contact importing process by instructing the user to take appropriate action. The section 526 includes a sequence of instructions, including an instruction for the user to scan the QR code 522, an instruction for the user to log in to the wireless service provider 240 to initiate contact importing, and an instruction to review new contact information after synchronization and updating of contact information. As shown, the section 526 includes a signal that the user should scan the QR code 522 with her mobile phone.

Figure 5C:
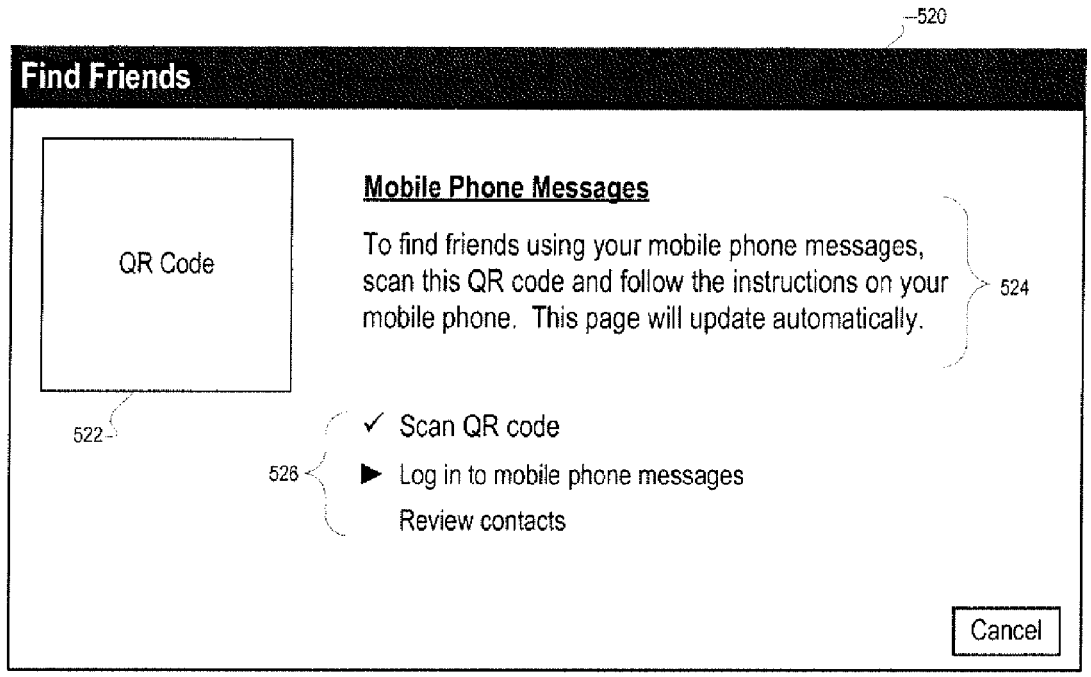

FIG. 5C illustrates the notice 520 provided for the user on her desktop computer after the user has scanned the QR code 522 with her mobile phone. The notice 520 may be provided as a web page by the social networking system 130. The section 526 has been automatically updated to indicate that the user has scanned the QR code 522 with her mobile phone. As shown, the section 526 includes a new signal to instruct the user to log in to the wireless service provider 240 using the mobile phone. The notice 520 may be provided for the user after the user has accessed the URL associated with the QR code 522 and the wireless service provider 240 has notified the social networking system 130 of such access.

Figure 5D:
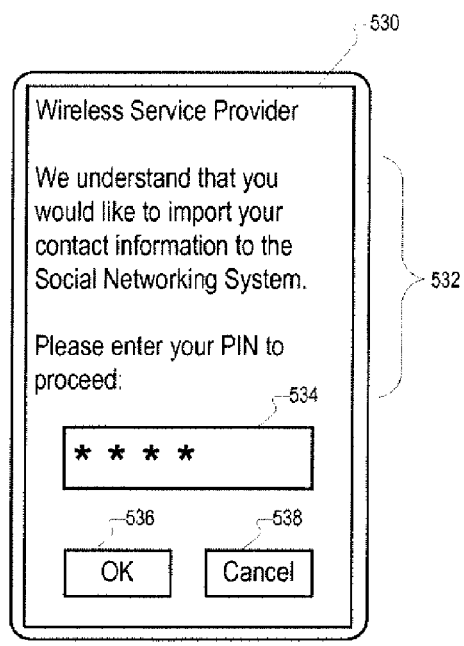

FIG. 5D illustrates an example notice 530 provided for the user on her mobile phone after the user has scanned the QR code 522. The notice 530 may be provided by the wireless service provider 240. The notice 530 includes a section 532 that confirms the desire of the user to import contact information from the wireless service provider 240 to the social networking system 130. The section 532 also instructs the user to provide her credentials, such as a PIN, to log in. A button 536, when selected, allows the user to proceed with log in after the provision of credentials. A button 538, when selected, terminates the contact importing process.

Figure 5E:
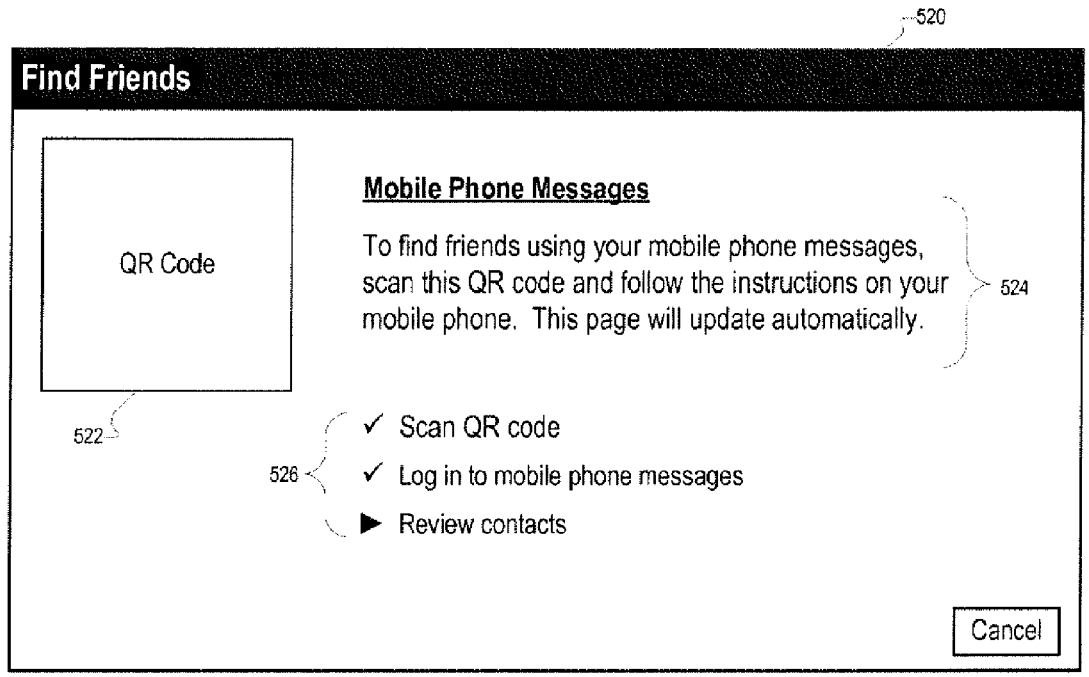

FIG. 5E illustrates the notice 520 provided for the user on her desktop computer after the user has logged in to the wireless service provider. The notice 520 may be provided as a web page by the social networking system 130. The section 526 has been automatically updated to indicate that the user has completed both scanning the QR code 522 and logging into the wireless service provider 240 with her mobile phone. After logging in to the wireless service provider 240, the contact information maintained by the wireless service provider 240 may be automatically imported to the social networking system 130 to synchronize with contact information maintained by the social networking system 130. As shown, the section 526 includes a new signal to instruct the user to review new contacts that have been identified after importation and synchronization of the contact information.

Figure 5F:
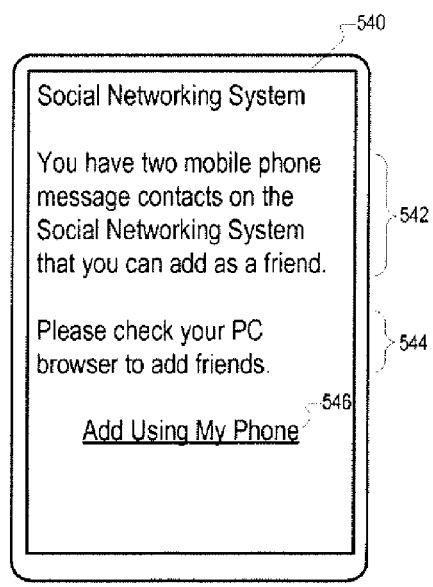

FIG. 5F illustrates an example notice 540 provided for the user on her mobile phone after synchronization of the contact information with the wireless service provider 240 and the social networking system 130. The notice 540 may be provided by the social networking system 130. As shown, the notice 540 includes a section 542 that informs the user that two new contacts from the contact information maintained by the wireless service provider 240 are members of the social networking system 130 and are candidates for addition to the social network of the user. A section 544 instructs the user to check her desktop computer to add the new contacts to her social network on the social networking system 130. A link 546, when selected, allows a user to use her mobile phone to add the new contacts to her social network. The functionality may be helpful if the desktop computer is not used by the user to add the contacts. The desktop computer may not be used, for example, if the pages provided by the social networking system 130 are not updated during contact importation or synchronization to allow addition of the contacts or if the browser running on the desktop computer has been closed.

Figure 5G:
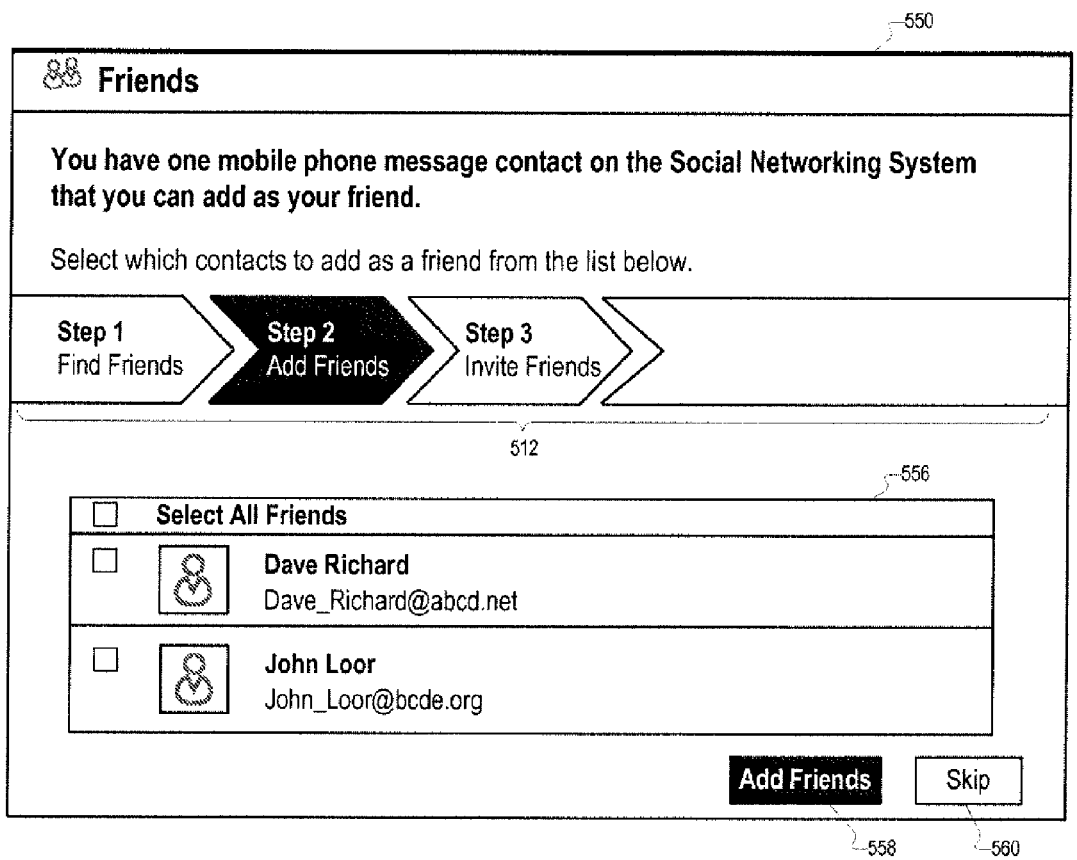

FIG. 5G illustrates an example notice 550 for a user on her desktop computer to proceed to a next step in the sequence to add selected new contacts to her social network on the social networking system 130. The notice 550 may be provided as a web page by the social networking system 130. As shown, the progress bar 512 indicates the completion of the first step involving the finding of new contacts from the contact information maintained by the wireless service provider 240. The progress bar 512 indicates the pendency of the second step involving selection of which of the new contacts are to be added to the social network of the user on the social networking system 130. The notice 550 includes a listing 556 of the new contacts for possible selection by the user. The user may select any number, or none, of the new contacts to receive an invitation to join her social network. A button 558, when selected, causes the social networking system 130 to advance to the third step involving preparation of invitations to invite the selected new contacts to join the social network of the user. A button 560, when selected, terminates the contact importing process. In an embodiment, any of the notices illustrated in FIGS. 5A-5G may be provided by the social networking system 130 or the wireless service provider 240.

CONCLUSION

Figure 6:
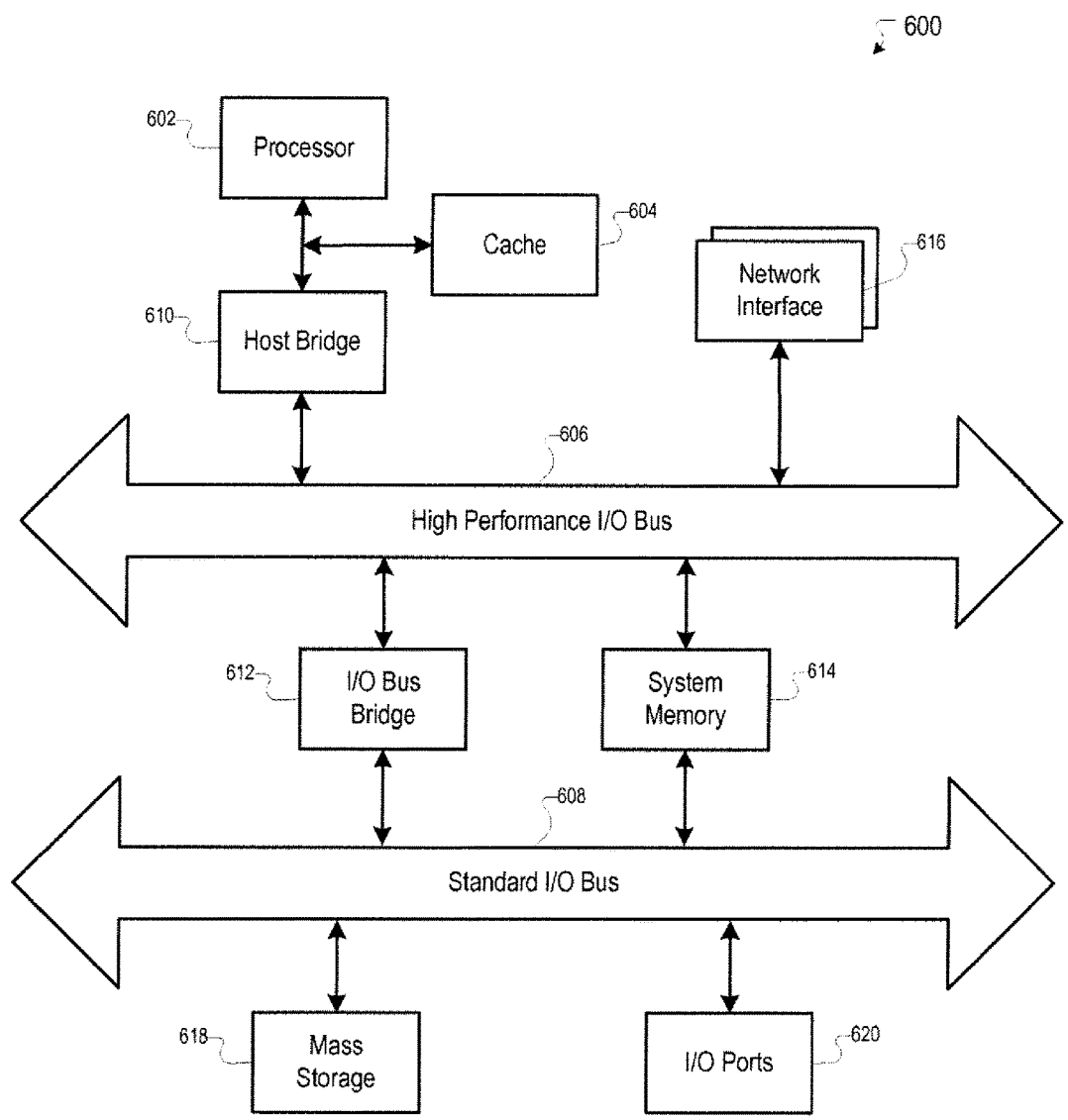
FIG. 6 shows a diagram of a computer system in accordance with an embodiment of the invention.

The foregoing processes and features can be implemented by a wide variety of machine and computer system architectures and in a wide variety of network and computing environments. FIG. 6 illustrates an example of a computer system 600 that may be used to implement one or more of the computing devices identified above. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 130, the user device 110, the external system 120, or a component thereof. In an embodiment of the invention, the computer system 600 may be one server among many that constitutes all or part of the social networking system 130.

The computer system 600 includes a processor 602, a cache memory 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples the processor 602 to the high performance I/O bus 606, whereas I/O bus bridge 612 couples the two buses 606 and 608 to each other. A system memory 614 and one or more network interfaces 616 couple to the bus 606. The computer system 600 may further include video memory and a display device coupled to the video memory (not shown). Mass storage 618 and I/O ports 620 couple to the bus 608. The computer system 600 may optionally include a keyboard and pointing device, a display device, or other input/output devices (not shown) coupled to the bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 which, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614, and then accessed and executed by processor 602.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

by one or more computing devices of a social-networking system, providing to a user of a wireless service provider a reference code identifying the user, wherein the user is associated with the social-networking system;

by the one or more computing devices, upon receiving the reference code by a mobile computing device of the user, providing an indication for the user to log in to the wireless service provider;

by the one or more computing devices, receiving first contact information for contacts of the user from the wireless service provider based on at least the reference code, wherein the first contact information is maintained by the wireless service provider;

by the one or more computing devices, identifying differences between the first contact information and second contact information maintained by the social network system; and by the one or more computing devices, updating the second contact information maintained by the social network system based on the identified differences, synchronizing the contact information maintained by the wireless service provider and the contact information maintained by the social-networking system, identifying new contact information including new contacts based on the synchronizing, requesting a selection of the new contacts to be added to a social network of the user, and providing invitations to the selection of the new contacts to join the social network of the user.

2. The method of claim 1, comprising providing the indication for the user to log in to the wireless service provider on the mobile computing device.

3. The method of claim 1, wherein the reference code includes a QR code associated with the user.

4. The method of claim 1, further comprising providing an indication for the user to provide credentials for the log in.

5. The method of claim 1, wherein the log in by the user includes provision of a PIN by the user.

6. The method of claim 1, comprising providing an indication for the user to log in to the wireless service provider on a desktop computer.

7. The method of claim 1, wherein the reference code is scannable by the mobile computing device of the user.

8. The method of claim 1, further comprising providing a progress bar to guide the user through a sequence associated with contact importing.

9. The method of claim 1, comprising providing a first notice to the user on a desktop computer to invite the user to import contact information from the wireless service provider to the social networking system.

10. The method of claim 9, comprising, after the user selects a link to log in to the wireless service provider using a mobile computing device, providing a second notice including the reference code associated with the user.

11. The method of claim 10, wherein the second notice is automatically updated to reflect a current status of contact importing.

12. A non-transitory computer storage medium storing computer-executable instructions that, when executed, cause a computer system to perform a computer-implemented method comprising:

providing to a user of a wireless service provider a reference code identifying the user, wherein the user is associated with the social-networking system;

upon receiving the reference code by a computing device of the user, providing an indication for the user to log in to the wireless service provider;

receiving first contact information for contacts of the user from the wireless service provider based on at least the reference code, wherein the first contact information is maintained by the wireless service provider;

identifying differences between the first contact information and second contact information maintained by the social network system; and updating the second contact information maintained by the social network system based on the identified differences, synchronizing the contact information maintained by the wireless service provider and the contact information maintained by the social-networking system, identifying new contact information including new contacts based on the synchronizing, requesting a selection of the new contacts to be added to a social network of the user, and providing invitations to the selection of the new contacts to join the social network of the user.

13. A system comprising:

at least one processor; and a memory storing instructions configured to instruct the at least one processor to perform:

providing to a user of a wireless service provider a reference code identifying the user, wherein the user is associated with the social-networking system;

upon receiving the reference code by a computing device of the user, providing an indication for the user to log in to the wireless service provider;

receiving first contact information for contacts of the user from the wireless service provider based on at least the reference code, wherein the first contact information is maintained by the wireless service provider;

identifying differences between the first contact information and second contact information maintained by the social network system; and updating the second contact information maintained by the social network system based on the identified differences, synchronizing the contact information maintained by the wireless service provider and the contact information maintained by the social-networking system, identifying new contact information including new contacts based on the synchronizing, requesting a selection of the new contacts to be added to a social network of the user, and providing invitations to the selection of the new contacts to join the social network of the user.

* * * * *